(12) United States Patent
Liu et al.

(10) Patent No.: US 11,530,506 B2
(45) Date of Patent: Dec. 20, 2022

(54) WASHING MACHINE

(71) Applicants: QINGDAO HAIER WASHING MACHINE CO., LTD., Shandong (CN); QINGDAO HAIER SMART TECHNOLOGY R&D CO., LTD., Shandong (CN); HAIER SMART HOME CO., LTD., Shandong (CN)

(72) Inventors: Hua Liu, Shandong (CN); Hongxia Sun, Shandong (CN); Yimin Li, Shandong (CN); Chunfeng Lao, Shandong (CN); Xinghui Hao, Shandong (CN); Di Wu, Shandong (CN); Haitao Liu, Shandong (CN)

(73) Assignees: QINGDAO HAIER WASHING MACHINE CO., LTD., Shandong (CN); QINGDAO HAIER SMART TECHNOLOGY R & D CO., LTD., Shandong (CN); HAIER SMART HOME CO., LTD., Shandong (CN)

( * ) Notice: Subject to any disclaimer, the term of this patent is extended or adjusted under 35 U.S.C. 154(b) by 0 days.

(21) Appl. No.: 16/976,291

(22) PCT Filed: Feb. 21, 2019

(86) PCT No.: PCT/CN2019/075740
§ 371 (c)(1),
(2) Date: Aug. 27, 2020

(87) PCT Pub. No.: WO2019/165929
PCT Pub. Date: Sep. 6, 2019

(65) Prior Publication Data
US 2021/0040670 A1  Feb. 11, 2021

(30) Foreign Application Priority Data
Feb. 27, 2018 (CN) .......................... 201810161902.1

(51) Int. Cl.
*D06F 37/10* (2006.01)
*D06F 23/02* (2006.01)
(Continued)

(52) U.S. Cl.
CPC .............. *D06F 37/10* (2013.01); *D06F 23/02* (2013.01); *D06F 37/06* (2013.01); *D06F 39/083* (2013.01); *D06F 39/088* (2013.01)

(58) Field of Classification Search
CPC .......... D06F 21/02; D06F 21/04; D06F 21/10; D06F 23/02; D06F 23/025; D06F 23/06;
(Continued)

(56) References Cited

U.S. PATENT DOCUMENTS 1,636,192 A * 7/1927 Mitchell ................. D06F 37/10
220/245
2,637,186 A * 5/1953 Douglas ................ D06F 23/025
68/23.4
(Continued)

FOREIGN PATENT DOCUMENTS

| CN | 101498086 A | 8/2009 |
|---|---|---|
| CN | 201631025 U | 11/2010 |

(Continued)

OTHER PUBLICATIONS

Machine Translation of Ren, CN-102080325-A, Jun. 2011. (Year: 2011).*

(Continued)

*Primary Examiner* — David G Cormier
(74) *Attorney, Agent, or Firm* — Buchanan Ingersoll & Rooney PC

(57) ABSTRACT

An inner drum cover is provided at a drum opening of an inner drum of a washing machine, the inner drum cover is used to open or close the drum opening, so that the inner drum forms a closed container after the drum opening is (Continued)

closed by the inner drum cover. The inner drum can perform washing after the inner drum cover is correspondingly fastened to the drum opening, so that clothes only come into contact with washing water in the sealed inner drum in a washing process. In this way, a case in which the clothes are contaminated because washing water between the inner drum and an outer drum flows into the inner drum is avoided, washing cleanliness of the washing machine is greatly improved, and incomplete washing of the clothes caused by contamination of the washing water between the inner drum and the outer drum is avoided.

9 Claims, 10 Drawing Sheets

(51) Int. Cl.
*D06F 37/06* (2006.01)
*D06F 39/08* (2006.01)

(58) Field of Classification Search
CPC ........ D06F 23/065; D06F 33/40; D06F 33/42; D06F 33/47; D06F 33/60; D06F 33/62; D06F 33/74; D06F 34/00; D06F 34/04–34; D06F 35/007; D06F 37/02; D06F 37/04; D06F 37/06; D06F 37/065; D06F 37/08; D06F 37/10; D06F 37/302; D06F 39/08; D06F 39/083; D06F 2101/00–20; D06F 2103/00–70; D06F 2105/50; D06F 2105/52–62
See application file for complete search history.

(56) References Cited

U.S. PATENT DOCUMENTS

| | | | |
|---|---|---|---|
| 3,436,934 A | 4/1969 | Stilwell | |
| 2013/0036774 A1* | 2/2013 | Kim | D06F 37/26 68/142 |
| 2015/0059414 A1* | 3/2015 | Behbehani | D06F 37/20 68/13 R |
| 2016/0326687 A1* | 11/2016 | Jo | D06F 37/267 |

FOREIGN PATENT DOCUMENTS

| | | | | |
|---|---|---|---|---|
| CN | 102080325 | A | * | 6/2011 |
| CN | 104727064 | A | | 6/2015 |
| CN | 105862318 | A | | 8/2016 |
| CN | 205688223 | U | * | 11/2016 |
| CN | 106319885 | A | | 1/2017 |
| CN | 106811910 | A | | 6/2017 |
| CN | 107687071 | A | | 2/2018 |
| CN | 108796962 | A | | 11/2018 |
| CN | 108796973 | A | | 11/2018 |
| CN | 108796997 | A | | 11/2018 |
| CN | 109423815 | A | | 3/2019 |
| CN | 109423817 | A | | 3/2019 |
| EP | 3617371 | A1 | | 3/2020 |
| GB | 1509315 | A | | 5/1978 |
| GB | 2364716 | A | | 2/2002 |
| JP | S46-036225 | Y1 | | 12/1971 |
| JP | H04-61896 | A | | 2/1992 |

OTHER PUBLICATIONS

Machine Translation of Liu et al., CN-205688223-U, Jun. 2016. (Year: 2016).*
International Search Report (with English Translation) and Written Opinion issued in corresponding International Patent Application No. PCT/CN2019/075740, 13 pages (dated May 14, 2019).
Chinese Search Report Issued in Corresponding Application No. 2018101619021 dated Jan. 21, 2021. 5 Pages.
EP Search Report Issued in Corresponding Application No. 19759943.4 dated Mar. 9, 2021, 8 pages.
Japanese Notice for Reasons for Refusal Issued in Corresponding Application No. 2020544784 dated Mar. 15, 2022. 9 Pages with English Translation.

* cited by examiner

WASHING MACHINE

TECHNICAL FIELD

The present disclosure belongs to the technical field of washing machines, and in particular, relates to a washing machine with only a rotatable and water holding inner drum.

BACKGROUND

In the prior art, a drum washing machine generally includes an inner drum and an outer drum which are sleeved mutually, wherein the outer drum is sealed to accommodate water, and the inner drum is configured to accommodate clothes and beat and wash clothes via rotation of the inner drum. Meanwhile, the inner drum is provided with water dehydrating holes, such that water in the outer drum flows into the inner drum through the water dehydrating holes to soak clothes in the inner drum, water in the inner drum flows to the outer drum through the water dehydrating holes, and moisture on the clothes in the inner drum is discharged out to the outer drum through the water dehydrating holes when the inner drum rotates at a high speed, to realize the purpose of washing clothes.

However, since the inner drum and the outer drum are sleeved mutually, in the using process of the washing machine, dirt easily accumulates between the inner drum and the outer drum. Meanwhile, since the inner drum and the outer drum are sleeved mutually, users cannot clean an outer wall of the inner drum and an inner wall of the outer drum, such that bacteria inside the washing machine increase, thereby lowering washing efficiency of the washing machine and lowering cleanliness of clothes after washing.

Meanwhile, in the above existing washing machine, since an outer side of the inner drum is sleeved with the outer drum, as to the washing process of the washing machine, clothes are beaten and washed via rotation of the inner drum, such that the washing capacity of the washing machine is based on the inner drum, an internal space of the washing machine is low in using efficiency, and the washing capacity of the washing machine cannot be expanded on the existing basis.

In view of this, it has become a research hotspot of how to set a washing machine to integrate the inner drum with the outer drum or directly set a closed inner drum, such that the inner drum is set to be a closed container, then the inner drum can accommodate water and clothes and can also rotate to beat clothes for washing, and also the problem that the space between the inner drum and the outer drum needs to be cleaned since washing water flows between the inner drum and the outer drum is further avoided. Meanwhile, since no outer drum is arranged in the washing machine, or the outer drum is integrated with the housing of the washing machine, the inner drum of the washing machine can be further enlarged, to expand the washing capacity of the washing machine.

However, since the inner drum can be not only configured to accommodate washing water, but also can rotate to beat and clean clothes in the drum, therefore, how to set a water dehydrating structure and a water drainage structure applicable to the above washing machine has become a problem to be urgently solved.

In view of the above technical shortcomings, the present disclosure is hereby provided.

SUMMARY

An objective of the present disclosure is to provide a washing machine to overcome the above shortcomings in the prior art. In the present disclosure, an inner drum cover used to open or close a drum opening of an inner drum is provided at the drum opening, so as to achieve an objective of sealing the drum opening to make the inner drum be formed as a sealed independent chamber for holding washing water to wash clothes. Another objective is to provide a washing machine, so that the inner drum has a dual function of rotating washing and containing washing water.

In order to solve the technical problem and achieve the technical effect, a basic design idea of the technical solution adopted by the present disclosure is as follows.

A washing machine is disclosed. The washing machine comprises an inner drum, an inner drum cover is provided at a drum opening of the inner drum of the washing machine. The inner drum cover is used to open or close the drum opening; so that the inner drum is formed a closed container after the drum opening is closed by the inner drum cover.

Further, the inner drum cover is independently arranged. An outer periphery of the inner drum cover is sealed and contacted with the drum opening to seal the drum opening.

Further, a bending portion which is horizontally bent is arranged at a periphery of the drum opening. An inner peripheral surface of the bending portion is correspondingly sealed and contacted with an outer peripheral surface of the inner drum cover. Preferably, the bending portion extends in a direction away from a bottom of the inner drum, and an extending end of the bending portion is arranged on a front end side of the drum opening.

Further, the bending portion is an inclined conical structure increasing radial width along an extending direction. Preferably, the bending portion includes a first bending portion and a second bending portion that are sequentially connected in the extending direction. The first bending portion is a tube structure horizontally extending, and the second bending portion is a conical structure that a small end is correspondingly connected to the first bending portion, and a large end forms the extending end of the bending portion.

Further, the inner drum cover is provided with a flange which is bent towards a front side of the inner drum. An outer side wall of the flange is correspondingly sealed and contacted with an inner side wall of the bending portion of the drum opening. Preferably, the flange includes a first flange and a second flange. The first flange correspondingly is sealed and contacted with the first bending portion, and the second flange is correspondingly sealed and contacted with the second bending portion. Further preferably, a length of the flange is greater than a length of the bending portion.

Further, at least one sealing ring is arranged at a position at which the inner drum cover is sealed and contacted with the drum opening, and two sides of the sealing ring are sealed and contacted with the inner drum cover and the drum opening respectively. Preferably, the sealing ring is made of a material having elastic deformation.

Further, the inner drum is provided with a drain opening, and a drain valve is installed at the drain opening. The washing machine is provided with a positioning and locking mechanism that fixes the inner drum when the inner drum rotates to a fixed drainage position. The washing machine is provided with a valve plug opening mechanism for opening the drain valve after the inner drum is rotated to the fixed drainage position, so that when the washing machine drains, and after the drum is rotated to the fixed drainage position, the drain valve is opened to drain away washing water in the drum. Preferably, the drain opening is arranged at an outer periphery of the bottom of the inner drum.

Further, at least one drain opening is arranged on a side wall of the drum, a sealing valve which moves along a radial direction of the inner drum to be open and close is arranged at the drain opening. A valve body of the sealing valve moves in a plane parallel with the bottom of the inner drum under an action of centrifugal force to open the drain opening in the bottom of the inner drum when the inner drum rotates at a high speed.

Further, the side wall of the inner drum is provided with lifting ribs extending along a generatrix of the inner drum, the lifting rib is hollow inside. The drain opening arranged on the side wall of the inner drum is communicated with a hollow part of the lifting rib, and the sealing valve corresponding to the drain opening is arranged in the hollow part of the lifting rib.

Further, a center of the bottom of the inner drum is connected to one end of a water inlet pipe, and another end of the water inlet pipe is connected to a water inlet box of the washing machine, to feed water into the inner drum through the center of the bottom of the inner drum.

Compared with the washing machine in the prior art, the washing machine of the present disclosure has the following beneficial effects.

The inner drum cover is provided at the drum opening, so as to make the inner drum be formed the sealed container that can perform washing after the drum opening is correspondingly closed by the inner drum cover, so that clothes only come to contact with washing water in a sealed drum in a washing process. In this way, a case in which the clothes are contaminated because the washing water between the inner drum and the outer drum flows into the inner drum is avoided, washing cleanliness of the washing machine is greatly improved, and incomplete washing of the clothes caused by contamination of the washing water between the inner drum and the outer drum is avoided.

At the same time, the inner drum cover is relatively independently arranged, so that the user only needs to open or close the inner drum cover, and the purpose of sealing and closing the drum opening can be realized.

In addition, the outer periphery of the inner drum cover and the drum opening are correspondingly sealed and contacted, to achieve an objective of sealing and fastening the outer periphery of the inner drum cover and the drum opening, and further achieve an effect that the inner drum cover is used to effectively seal the drum opening through which the clothes are put into the inner drum.

At the same time, the washing machine of the present disclosure has a simple structure and significant effects, and is suitable for popularization and use.

In order to make the design concept of the technical solution of the present disclosure clearer and facilitate further understanding of the beneficial effects brought about by the technical solution, some specific implementations of the present disclosure are described in detail below with reference to the accompanying drawings.

BRIEF DESCRIPTION OF THE DRAWINGS

The accompanying drawings are used as a part of the present disclosure to further explain the present disclosure. The illustrative embodiments and descriptions of the present disclosure are used to explain the present disclosure, but do not constitute an improper limitation on the present disclosure. Obviously, the accompanying drawings in the following description are only some embodiments. For those skilled in the art, other drawings can be obtained according to these drawings without paying creative work. In the drawings.

Figure 1:
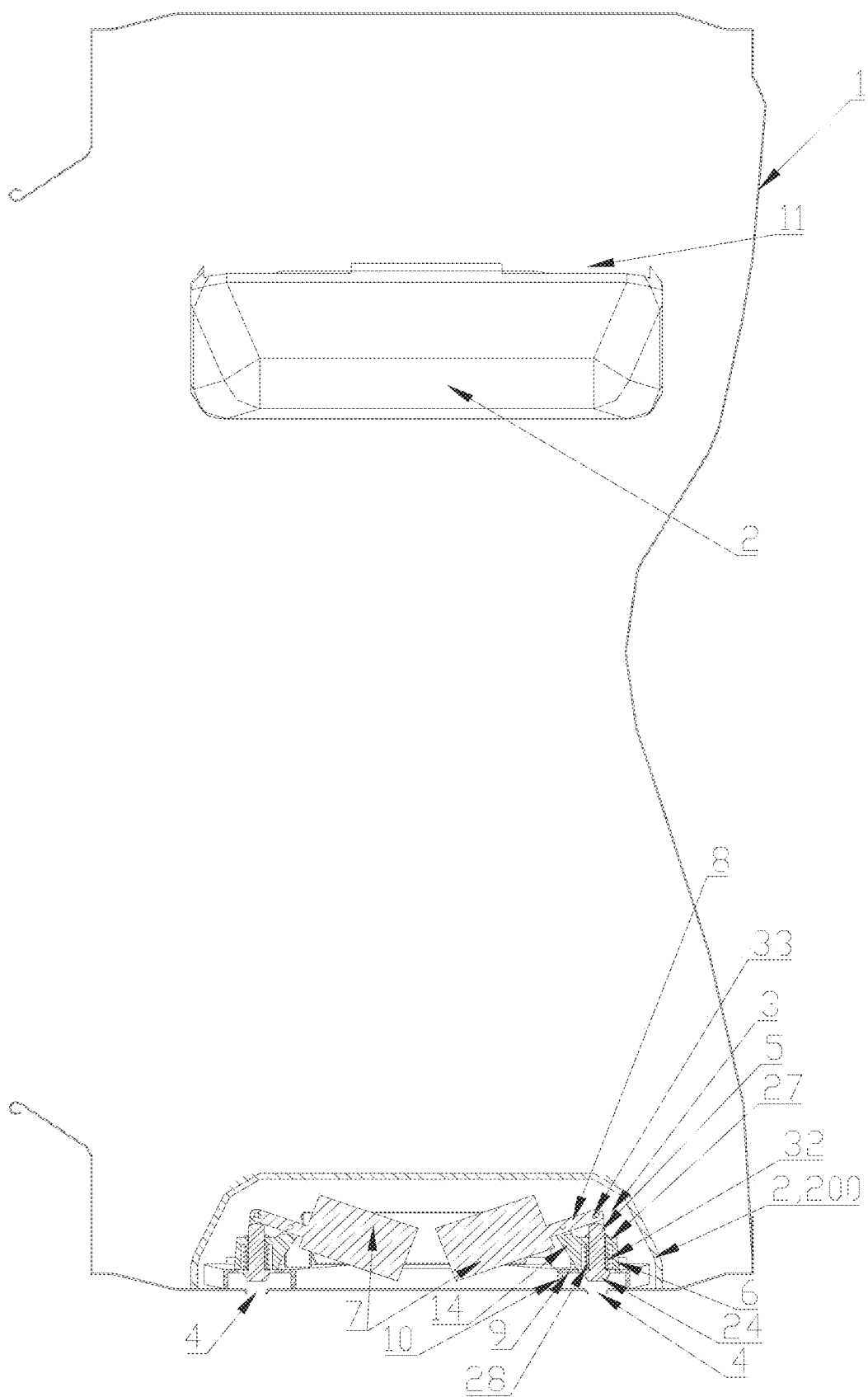
FIG. 1 is a schematic structural diagram of an inner drum of a washing machine according to an embodiment of the present disclosure.

Reference signs in the drawings: 100-housing, 300-inner drum support, 400-door cover, 500-drive motor, 610-damping hanging spring, 620-damping support rod, 700-inner drum cover, 900-water inlet pipe, 230-drain opening, 240-drain valve, 250-valve plug, 260-limiting spring, 270-rotating wheel, 280-connecting rod, 290-limiting hole, 320-water collection tank, 310-drain hose, 330-drain valve, 440-locking pin, 450-locking groove, 901-flange, 902-first flange, 903-second flange, 910-spray water inlet structure, 101-drum opening, 102-bottom of the inner drum, 103-bending portion, 104-first bending portion, 105-second bending portion, 1-inner drum, 2-lifting rib, 3-mounting cavity, 4-drain opening, 5-valve plug column, 6-mounting sleeve, 7-counterweight, 8-connecting rib, 9-support plate, 10-support rib, 11-notch, 12-water penetration hole, 13-slot, 14-second extending rib, 15-first mounting rib, 16-second mounting rib, 17-bolt, 18-positioning pin, 19-bolt hole, 20-fixing rib, 21-claw, 22-limiting rib, 23-through hole, 24-valve plug, 25-jack, 26-positioning groove, 27-folding edge, 28-inner peripheral folding edge, 29-mounting rib, 30-extending rib, 31-hinge hole, 32-reset spring, 33-long-strip-shaped through hole, 200-lifting rib body.

It should be noted that these drawings and text descriptions are not intended to limit the scope of the conception the present disclosure in any way, but to explain the concept of the present disclosure for those skilled in the art by referring to specific embodiments.

DETAILED DESCRIPTION

In order to make the objectives, technical solutions and advantages of the embodiments of the present disclosure clearer, the technical solutions in the embodiments are described clearly and completely with reference to the accompanying drawings in the embodiments of the present disclosure. The following embodiments are used to illustrate the present disclosure, but not used to limit the scope of the present disclosure.

In the description of the present disclosure, it should be noted that orientation or positional relationships indicated by the terms "upper", "lower", "front", "rear", "left", "right", "vertical", "inner", "outer", etc., are orientation or positional relationships shown in the drawings, and are only for the convenience of describing the present disclosure and simplifying the description, and it is not indicated or implied that the indicated device or element has a specific orientation or is structured or operated in a specific orientation, and therefore this cannot be understood as a limitation of the present disclosure.

In the description of the present disclosure, it should be noted that the terms "install", "connected" and "connection" should be understood in a broad sense unless otherwise clearly specified and limited, for example, may be a fixed connection, or may be a detachable connection, or may be an integrated connection; may be a mechanical connection, or may be an electrical connection; may be a direct connection or an indirect connection by using an intermediate medium. For those skilled in the art, the specific meaning of the above terms in the present disclosure can be understood in specific situations.

As shown in FIG. 1-FIG. 12, embodiments of the present disclosure introduce a washing machine. The washing machine includes a housing 100, an inner drum 1 is arranged in the housing 100, and an axis of the inner drum 1 extends horizontally or gradually inclines downward from front to rear. A front end of the inner drum 1 is provided with a drum opening 101 that is arranged in an open manner, and a rear end of the inner drum 1 is provided with a bottom of the inner drum 102 that is arranged in a sealed manner. There is no through hole in a drum wall of the inner drum 1, so that the inner drum 1 forms a sealed container with which only an opening is formed in the front end. At the same time, a door cover 400 that can be opened outward is installed at a front end of the housing 100 of the washing machine, to seal the drum opening 101 after the door cover 400 is closed, and to put clothes into the inner drum 1 through the drum opening 101 after the door cover 400 is opened. The rear end of the inner drum 1 is installed in the housing 100 of the washing machine via an inner drum support 300. The inner drum support 300 is coaxially arranged with the rear end of the inner drum 1. An upper end and a lower end of the inner drum support 300 are respectively bent toward a direction of the drum opening on the front end of the inner drum 1. Bending portions, which are formed by the upper end and the lower end of the inner drum support being bent toward the drum opening respectively, extend at least to a middle of the inner drum 1. An upper bending portion and a lower bending portion are respectively connected to the housing 100 of the washing machine via a damping hanging spring 610 and a damping support rod 620 to achieve an objective that the inner drum support 300 can be installed in the housing 100 of the washing machine in a vibrating manner. At the same time, a center of the bottom of the inner drum 102 is coaxially arranged with a motor shaft of a drive motor 500 of the washing machine, to drive the inner drum 1 to rotate, and the inner drum 1 and the drive motor 500 are both fixedly installed on the inner drum support 300. Preferably, the bottom of the inner drum 102 and the drive motor 500 are respectively arranged on two sides of the inner drum support 300, the drive motor 500 is fixedly connected to the inner drum support 300, the motor shaft of the drive motor 500 passes through the inner drum support 300 via a bearing and is coaxially fixedly connected to the bottom of the inner drum 102, and the motor shaft of the drive motor 500 can rotate relative to the inner drum support 300, to achieve an objective that the inner drum 1 and the drive motor 500 are mounted on the inner drum support 300, and the inner drum 1 can rotate independently under an action of the drive motor 500 to wash clothes in the inner drum.

In addition, the washing machine in the embodiments of the present disclosure can be any washing machine in the prior art that an inner drum forms a sealed container after a door cover closes an drum opening. When the washing machine executes a dehydration process, the inner drum is controlled to rotate at a high speed, and the water flow separated from the clothes in the inner drum is smoothly drained from the inner drum, so as to achieve an objective of normally executing the dehydration process for a holeless drum washing machine. Therefore, the washing machine in the embodiments of the present disclosure is not limited to the structure in the drawings. For example, an existing ordinary washing machine may further be used provided that the inner drum 1 of the washing machine is arranged without dehydration holes, and a sealed container is formed after the door cover 400 closes the drum opening 101. At the same time, the washing machine in the embodiments of the present disclosure can further be applicable to a top-opening washing machine. A clothes delivery opening is formed in the side wall of the inner drum, and a door body that can be turned outwards to be opened and closed so as to correspondingly seal and unseal the clothes delivery opening can be arranged on the side wall of the inner drum. After the inner drum stops rotating, the inner drum is positioned at a corresponding position, so that a user can correspondingly open the door body, and put the clothes into or take the clothes out of the inner drum of the washing machine through the clothes delivery opening.

At the same time, the inner drum is disposed as the sealed container for washing after the door cover is closed, so that the clothes only come into contact with the washing water in the sealed inner drum during washing. In this way, a case in which the clothes are contaminated because the washing water between the drum and the outer drum flows into the inner drum is prevented, washing cleanliness of the washing machine is greatly improved, and incomplete washing of the clothes caused by contamination of the washing water between the inner drum and the outer drum is avoided.

Embodiment 1

Figure 8:
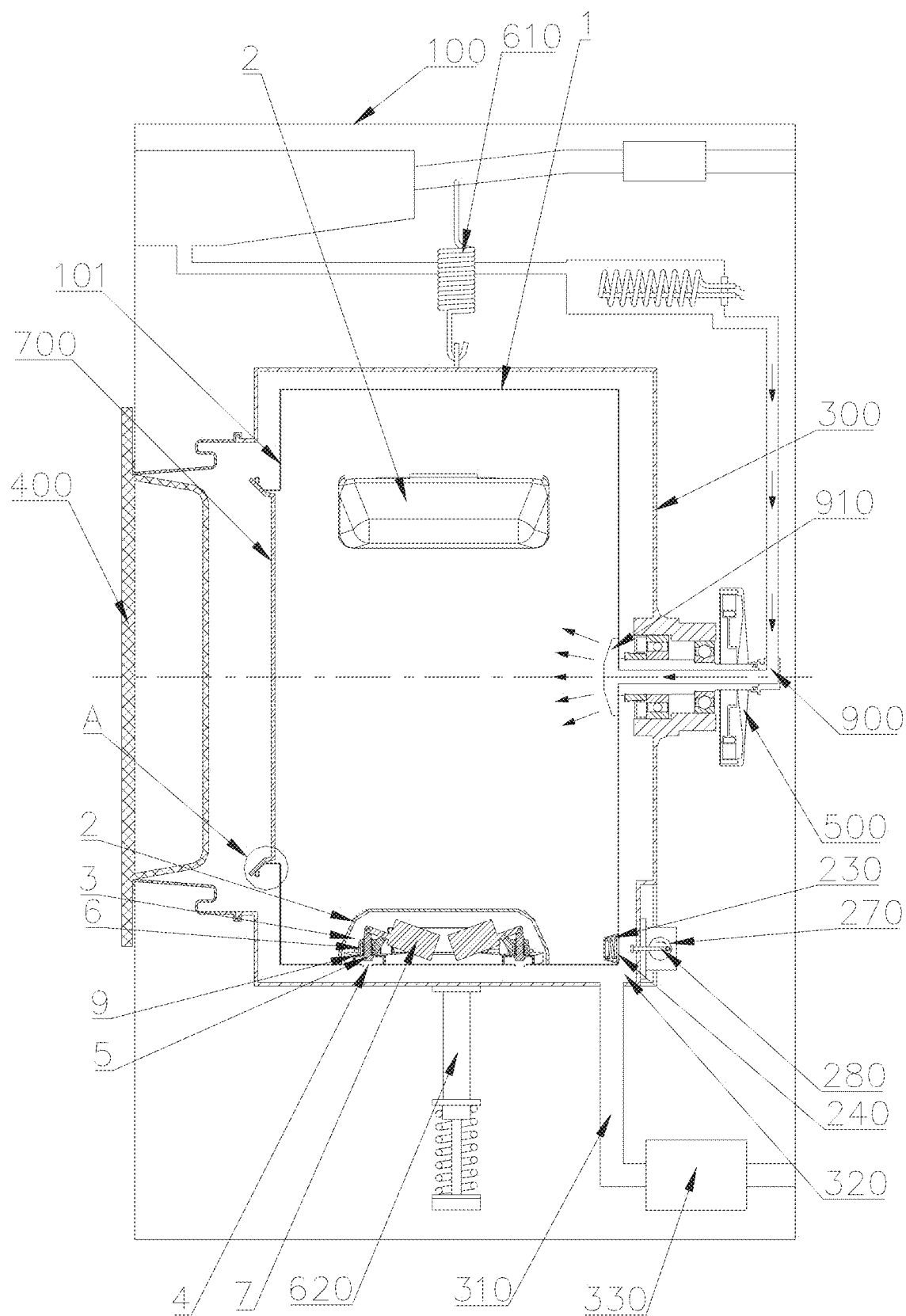
FIG. 8 is a schematic structural diagram of an axial section of the washing machine according to an embodiment of the present disclosure.
Figure 12:
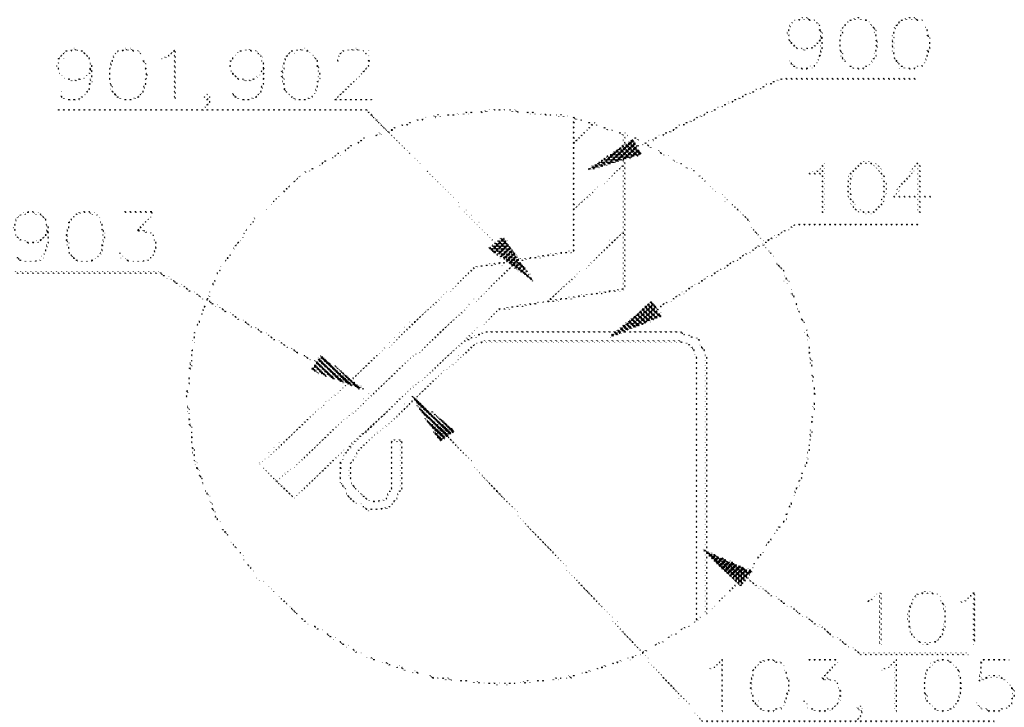
FIG. 12 is an enlarged schematic structural diagram of part A in FIG. 8 according to an embodiment of the present disclosure.

As shown in FIG. 8 and FIG. 12, in the embodiment of the present disclosure, in order to seal the drum opening 101 of the washing machine, prevent washing water from flowing out through the drum opening, and implement that the inner drum 1 is sealed to hold water for normal washing during a working process of the washing machine. Settings are made as follows.

In this embodiment, a washing machine is introduced. The drum opening 101 of the washing machine is provided with an inner drum cover 700 that can seal and unseal the drum opening, to make the inner drum form the sealed container after the inner drum cover 700 is correspondingly fastened to the drum opening 101.

The drum opening is provided with the inner drum cover, to make the inner drum form the sealed container that can perform washing after the inner drum cover is correspondingly fastened to the drum opening, so that clothes only come to contact with washing water in the sealed inner drum in the washing process. In this way, a case in which the clothes are contaminated because the washing water between the inner drum and the outer drum flows into the inner drum is avoided, washing cleanliness of the washing machine is greatly improved, and incomplete washing of the clothes caused by contamination of the washing water between the inner drum and the outer drum is avoided.

In addition, an outer periphery of the inner drum cover and the drum opening are correspondingly fitted and sealed, to achieve an objective of sealed fastening of the outer periphery of the inner drum cover and the drum opening, so as to further achieve an effect that the inner drum cover is used to effectively seal the drum opening through which the clothes are put into the inner drum.

In this embodiment, the inner drum cover 700 is independently arranged, and the outer periphery of the inner drum cover 700 and the drum opening 101 are sealed and fitted to seal the drum opening 101. The inner drum cover is relatively independently arranged, so that the drum opening can be sealed and fastened when the user only needs to close the inner drum cover.

In the embodiment, a bending portion 103 which is horizontally bent is arranged at a periphery of the drum opening 101, and an inner peripheral surface of the bending portion 103 is correspondingly sealed and contacted with an outer peripheral surface of the inner drum cover 700. Preferably, the bending portion 103 extends in a direction away from the bottom of the inner drum 102, and an extending end of the bending portion 103 is arranged on a front end side of the drum opening 101. A circle of horizontally bent bending portion is arranged at the drum opening, and the outer periphery surface of the inner drum cover is correspondingly in fitted and sealed contact with the inner peripheral surface of the bending portion, so as to change from a line-to-line sealed contact to a line-to-surface sealed contact between the inner drum cover and the drum opening. In this way, a sealed contact area is increased, and sealing performance is improved.

In the embodiment, the bending portion 103 is of an inclined conical structure with increasing radial width along an extending direction. Preferably, the bending portion 103 includes a first bending portion 104 and a second bending portion 105 that are sequentially connected in the extending direction. The first bending portion 104 is of a tube structure horizontally extending, and the second bending portion 105 is of a conical structure that a small end is correspondingly connected to the first bending portion 104, and a large end forms the extending end of the bending portion 103.

The bending portion is proposed to be the first bending portion and the second bending portion that are connected, so that the inner drum cover is guided to slide into the first bending portion under an action of the conical second bending portion, and is correspondingly in sealed and fitted with the inner periphery of the drum opening via the tube-shaped first bending portion. In this way, not only is the sealing assembly of the inner drum cover and the drum opening ensured, but also quick fastening and positioning of the inner drum cover are realized.

In the embodiment, the inner drum cover 700 is provided with a flange 901 that is bent towards a front side of the inner drum, and an outer side wall of the flange 901 is correspondingly sealed and contacted with an inner side wall of the bending portion 103 of the drum opening 101. A circle of flange which is correspondingly matched with the bending portion arranged at the drum opening is arranged on the outer periphery of the inner drum cover, so that the outer periphery of the inner drum cover is correspondingly sealed and contacted with the inner peripheral surface of the bending portion. In this way, sealed contact between the inner drum cover and the drum opening becomes surface-to-surface sealed contact, a sealed contact area is increased, and sealing performance of the drum opening is significantly improved.

Preferably, the flange 901 includes a first flange 902 and a second flange 903. The first flange 902 is correspondingly sealed and contacted with the first bending portion 104, and the second flange 903 is correspondingly sealed and contacted with the second bending portion 105. Further preferably, a length of the flange 901 is greater than a length of the bending portion 103.

In the embodiment, at least one sealing ring is arranged at the position at which the inner drum cover 700 is sealed and contacted with the drum opening 101. Two sides of the sealing ring are sealed and contacted with the inner drum cover 700 and the drum opening 101 respectively. Preferably, the sealing ring is made of a material that can produce elastic deformation. At least one sealing ring is additionally arranged at the position at which the inner drum cover is sealed and contacted with the drum opening, to improve sealing performance at the drum opening, thus effectively avoiding the outflow of washing water in the inner drum.

Embodiment 2

In the embodiment, in order to feed water into the inner drum of the washing machine and implement normal washing by sealing the inner drum to hold water during a working process of the washing machine. Settings are made as follows.

Figure 9:
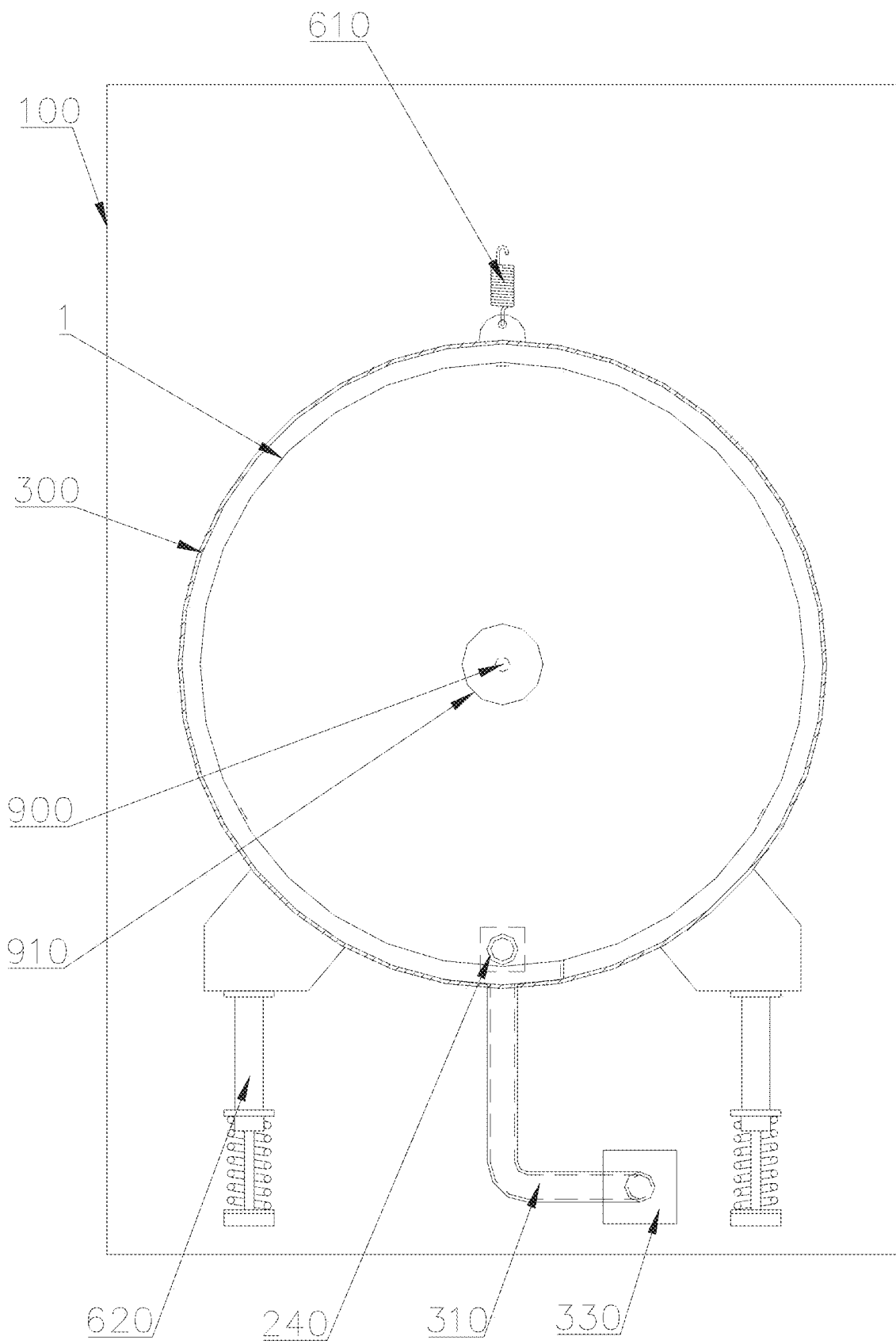
FIG. 9 is a schematic structural diagram of a radial section of a washing machine according to an embodiment of the present disclosure.

As shown in FIG. 8 and FIG. 9, the embodiment introduces a water inlet structure of the washing machine. The housing 100 of the washing machine is provided with an inner drum 1, and a rear part of the inner drum 1 is the bottom of the inner drum 102, and the center of the bottom of the inner drum 102 is connected to the inner drum support 300 by using a rotating shaft extending axially backward. The center of the bottom of the inner drum 102 communicates to one end of a water inlet pipe 900. The water inlet pipe 900 passes through the rotating shaft and extends upward to communicate with a water inlet box of the washing machine. The water inlet pipe 900 is provided with a water inlet valve and/or a water inlet pump for controlling the opening and closing of water flow, so as to achieve an objective of feeding water from the rear part of the inner drum of the washing machine into the inner drum.

At the same time, a heating device can be arranged on the water inlet pipe 900 to heat water flowing into the inner drum through the water inlet pipe 900, to control a water temperature of washing water in the inner drum, so as to further achieve an objective of performing washing by using washing water at a suitable temperature in the inner drum of the washing machine.

By the above settings, water enters the inner drum through the center of the bottom of the inner drum of the washing machine, and the drum opening is sealed by using the inner drum cover, so that the water enters the inner drum through a center of the inner drum and the water is sealed in the inner drum, the inner drum can normally rotate after the water enters into the inner drum, and the water inlet pipe cannot move with the rotation of the inner drum. In this way, the inner drum is sealed during the rotation of the inner drum, and the drain valve is opened during draining to normally drain the water held in the inner drum, and an objective of normal water introduction of the washing machine with dual functions of drum rotation and water holding is achieved. At the same time, an outer drum does not need to be arranged outside the inner drum, so that a volume of the inner drum is increased, and a washing capacity of the washing machine is improved.

In the embodiment, in order to improve a stability of water feeding, settings can be made as follows: the bottom of the inner drum 102 is provided with a spray water inlet structure 910 that guides water into the inner drum 1 in a divergence manner, so that the washing water that flows into the inner drum 1 through the water inlet pipe 900 forms divergent spray water under an action of the spray water inlet structure 910. The spray water is sprayed into the inner drum 1 to increase a coverage area and uniformity of inlet water, thereby improving wetting efficiency of clothes.

Embodiment 3

In the embodiment of the present disclosure, in order to drain water from the inner drum of the washing machine and to seal the inner drum to hold water for normal washing during a working process of the washing machine, settings are made as follows.

As shown in FIG. 8 to FIG. 11, a drainage structure of the washing machine is provided. The inner drum 1 is installed in the housing 100 of the washing machine; a drain opening 230 is formed in the inner drum 1. A drain valve 240, in a normally off state, is installed at the drain opening 230. The washing machine is provided with a positioning and locking mechanism that fixes the inner drum 1 when the inner drum 1 rotates to the fixed drainage position. The washing machine is provided with a valve plug opening mechanism for opening the drain valve 240 after the inner drum 1 is rotated to the fixed drainage position. In this way, when the washing machine is in a draining state, and after the inner drum 1 is rotated to the fixed drainage position, the drain valve 240 is opened to drain washing water in the inner drum.

When the washing machine is in normal washing process, the drain valve is switched off, the drain opening is in a closed state, and water in the inner drum does not flow out through the drain opening. When the washing machine is in the draining state, the inner drum of the washing machine is rotated to the fixed drainage position under an action of the positioning and locking mechanism, the valve plug opening mechanism on the washing machine is started, which pushes the valve plug of the drain valve to open, the drain opening is in an open state, and the water in the inner drum flows out through the drain opening.

By the above settings, the drain valve is switched off when the washing machine is in a normal washing state, and when the washing machine drains water, the drain valve is opened by a joint action of the positioning and locking mechanism and the valve plug opening mechanism, so that the water held in the inner drum does not flows out through the drain opening when the inner drum rotates normally. In this way, the inner drum is sealed during the rotation of the inner drum, and the drain valve is opened during draining to normally drain the water held in the inner drum. An objective of normal water draining of the washing machine with dual functions of drum rotation and water holding is achieved. At the same time, an outer drum does not need to be arranged outside the inner drum, so that a volume of the inner drum is increased, and a washing capacity of the washing machine is improved.

As shown in FIG. 8 to FIG. 11, the embodiment introduces the drainage structure of the washing machine. The inner drum 1 is installed in the housing 100 of the washing machine. The inner drum 1 is provided with the drain opening 230. The drain valve 240 in a normally closed state is installed at the drain opening 230. The washing machine is provided with the positioning and locking mechanism that fixes the inner drum 1 when the inner drum 1 rotates to the fixed drainage position. The washing machine is provided with the valve plug opening mechanism for opening the drain valve 240 after the inner drum 1 is rotated to the fixed drainage position. In this way, when the washing machine is in the draining state, and after the inner drum 1 is rotated to the fixed drainage position, the drain valve 240 is opened to drain the washing water in the inner drum 1.

In the embodiment, the drain opening 230 is formed on an outer side wall or an outer periphery of the front end or the rear end of the inner drum 1. Preferably, the inner drum 1 is set to be a conical cylinder with a small diameter at one end and a large diameter at the other end. The drain opening 230 is formed in an outer periphery of a large end, with the large diameter, of the inner drum 1. The drain opening is formed in the large end of the conical inner drum, so that the water in the inner drum can converge and flow towards the drain opening. In this way, all the water in the inner drum can be drained through the drain opening.

In the embodiment, the rear end of the inner drum 1 is formed by the bottom of the inner drum 102, and the front end of the inner drum 1 is formed by the drum opening 101. And the bottom of the inner drum 102 and the drum opening 101 are connected by a drum side wall. The drum side wall is a conical surface with a diameter increasing in a direction from the drum opening 101 to the bottom of the inner drum 102. The outer periphery of the bottom of the inner drum 102 is provided with the drain opening 230 that is formed in a horizontally penetrating manner. The drain opening 230 is provided with the drain valve 240. The drain valve 240 includes a valve plug 250 covering the drain opening 230. And the valve plug 250 is connected to the bottom of the inner drum 102 via a limiting spring 260, so that the valve plug 250 blocks the drain opening 230 from inside to outside under an action of the limiting spring 260. The valve plug is connected to the bottom of the inner drum via the limiting spring, the limiting spring provides an elastic pulling force for the valve plug in an outer direction of the inner drum, and the valve plug is correspondingly closely fitted with the bottom of the inner drum under an action of the elastic force, so that the valve plug blocks the drain opening to seal the drain opening.

In the embodiment, the drain opening 230 on the inner drum 1 is set to be a tapered hole gradually widened from an inside to an outside of the inner drum 1. An end with small diameter of the tapered hole is sealed, and a side wall of the tapered hole is provided with a through hole to communicate the inside and the outside of the inner drum 1. The valve plug 250 is of a plate structure covering an end with a large diameter of the tapered hole. The limiting spring 260 extending along an axis is arranged in the tapered hole. One end of the limiting spring 260 is connected to a sealing part of the end with small diameter of the tapered hole, and the other end of the limiting spring 260 is connected to the valve plug 250. The limiting spring 260 is in a tensioned state to apply a thrust to the valve plug 250 toward the outside of the inner drum 1, so that the valve plug 250 blocks the drain opening 240.

In the embodiment, the inner drum support 300 is provided at the rear end of the inner drum 1, and the inner drum support 300 is installed in the housing 100 of the washing machine via a damping hanging spring 610 and/or a damping support rod 620. The valve plug opening mechanism is installed on the inner drum support 300.

In the embodiment, when the inner drum 1 is at the fixed drainage position, the drain opening 230 is at the lowest position of the inner drum 1, and the water in the inner drum 1 converges and flows to the drain opening 230, and flows out through the drain opening 230 opened by the drain valve 240. The valve plug opening mechanism is installed on a side, away from the inner drum 1 and opposite to the outer periphery of the inner drum 1, of the inner drum support 300. When the inner drum 1 is at the fixed drainage position, the drain opening 230 and a connecting rod 280 of the valve plug opening mechanism are correspondingly coaxially arranged. In this way, the connecting rod 280 produces axial expansion under an action of a stepping motor and a rotating wheel 270, and the valve plug 250 of the drain valve 240 is driven to move to the inside of the inner drum 1 to open the drain opening 230.

Figure 10:
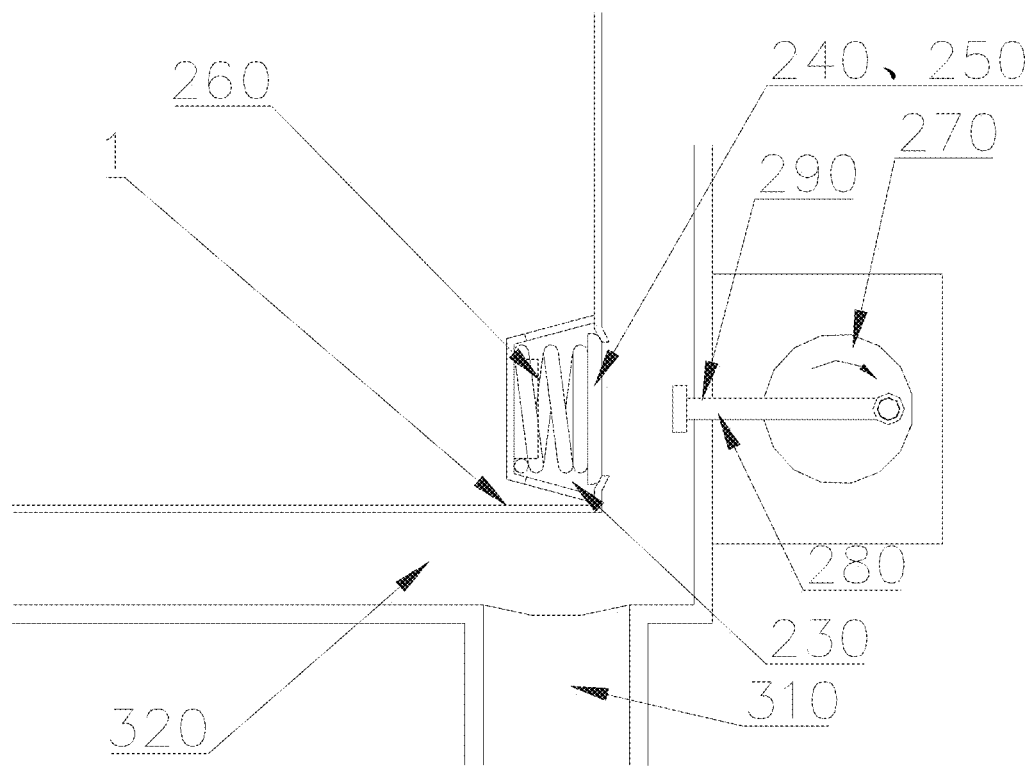
FIG. 10 is an enlarged schematic structural diagram of a switched-on state of a drain valve according to an embodiment of the present disclosure.
Figure 11:
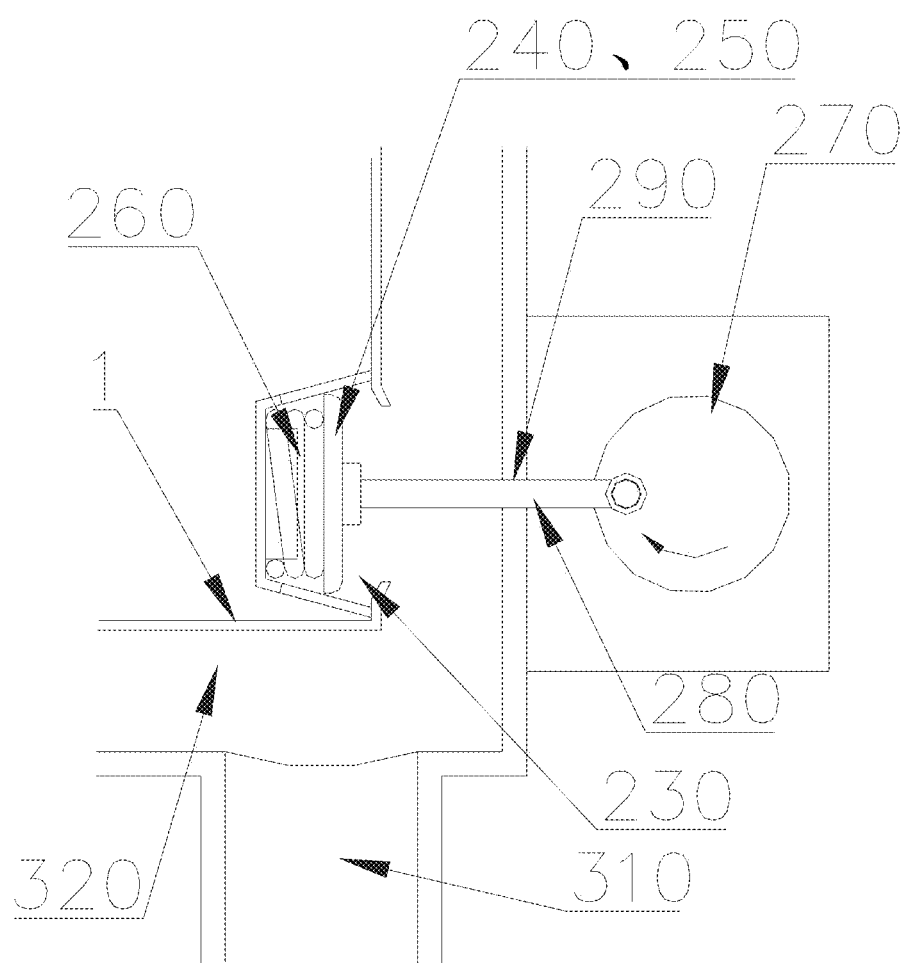
FIG. 11 is an enlarged schematic structural diagram of a switched-off state of a drain valve according to an embodiment of the present disclosure.

As shown in FIG. 10 and FIG. 11, in the embodiment, the valve plug opening mechanism includes the stepping motor mounted on the inner drum support 300, an output end of the stepping motor is provided with the rotating wheel 270 fixed and connected coaxially. An outer periphery of the rotating wheel 270 is hinged with one end of the connecting rod 280, and the other end of the connecting rod 280 passes through a limiting hole formed in the inner drum support 300 to move telescopically towards the drain valve 240, so as to drive the valve plug 250 to move towards the inside of the inner drum 1 to switch on the drain valve 240 to drain water.

In the embodiment, a water collection tank 320 is correspondingly formed outside the drain opening 230 of the inner drum 1, and a bottom of the water collection tank 320 is connected to a drain hose 310 of the washing machine, to collect water drained through the drain opening 230 of the inner drum 1 and then drain the water out. A drain valve 330 is arranged at the drain hose to correspondingly control the opening and closing of the drain hose.

In the embodiment, the drain opening 230 is formed on the outer periphery of the bottom of the inner drum 102. When the inner drum 1 is at the fixed drainage position, the drain opening 230 is rotated to be directly below the axis of the inner drum 1. The water collection tank 320 includes a groove correspondingly formed below the drain opening 230, and a rear side wall of the groove vertically extends upward to the rear side of the drain opening 230 and is spaced from the drain opening 230 by a certain distance, to guide the water flowing through the drain opening 230 to fall into the water collection tank 320, so as to prevent drained water flowing backwards from the horizontally arranged drain opening from splashing to the outside of the washing machine. At the same time, a front side wall of the water collection tank 320 is fitted to a lower part of the inner drum 1 of the washing machine, or a gap between the water collection tank and the drum is extremely small, to ensure that water in the water collection tank 320 does not splash out from a front end of the water collection tank 320, thereby avoiding the drained water overflow of the inner drum.

In the embodiment, the water collection tank 320 is formed on the inner drum support 300 of the washing machine or is integrally formed with the inner drum support 300, and the valve plug opening mechanism is installed on the water collection tank 320.

In the embodiment, the positioning and locking mechanism can be any existing mechanism that can control the inner drum of the washing machine to rotate to the fixed drainage position and fix the inner drum. For example, a drive motor 500 that drives the inner drum to rotate is provided with a corresponding control program to control the inner drum to rotate to the fixed drainage position and lock the inner drum, so that the inner drum no longer rotates. The positioning and locking mechanism can further be set as follows: a locking groove recessed inward is formed in the side wall of the inner drum 1, and a locking pin corresponding to the locking groove is installed on the washing machine; the locking pin can be telescopically mounted on the housing 100 of the washing machine or the inner drum support 300 along the radial direction of the inner drum; when the locking pin retracts inward under an action of a driving device, the locking pin is separated from the locking groove, and the inner drum 1 rotates freely; and when the locking pin pops out under the action of the driving device, the locking pin extends into the locking groove in the inner drum 1, the inner drum 1 no longer rotates, and the inner drum 1 is at the fixed drainage position, so that the drain opening 230 is at a position corresponding to the valve plug opening mechanism.

As shown in FIG. 10, during a normal washing process of the washing machine, the drain valve is switched off, the inner drum rotates normally, and the water held in the inner drum does not flow out through the drain opening, and clothes are washed normally. As shown in FIG. 11, during the draining process of the washing machine, the inner drum is rotated to the fixed drainage position, the stepping motor drives the rotating wheel to rotate, the rotating wheel drives the connecting rod to move towards the inner drum, an end of the connecting rod drives the valve plug of the drain valve at an opposite position to move to the inside of the inner drum, and the valve plug overcomes a pulling force of the spring and is pushed to open the drain opening, the water in the inner drum flows out through the opened drain opening, and after being collected by the water collection tank, outflowing water is drained to the outside of the washing machine through the drain hose. In this way, the water held in the inner drum is drained.

Embodiment 4

The differences between Embodiment 4 and Embodiment 3 are as follows: the valve plug opening mechanism includes an electromagnet installed on the inner drum support 300, and the electromagnet is arranged corresponding to the drain valve 240, so that the drain valve 240 and the electromagnet are in a coaxial direction when the inner drum 1 is rotated to the fixed drainage position. The valve plug 250 of the drain valve 240 is provided with a magnet or the valve plug is entirely formed by the magnet, so that the electromagnet is energized to provide electromagnetic repulsion for the valve plug 250 to drive the valve plug 250 to move towards the inside of the inner drum 1 to switch on the drain valve 240 to drain water.

During the normal washing process of the washing machine, the drain valve is switched off, the drum rotates normally, the water held in the inner drum does not flow out through the drain opening, and the clothes are washed normally. During the draining process of the washing machine, the inner drum rotates to the fixed drainage position, the electromagnet is energized, and the electromagnet provides a repulsive force for the valve plug, so that the valve plug moves towards the inside of the inner drum by overcoming a spring force under the action of a repulsive force. Under the action of repulsive force, the valve plug overcomes an elastic force of the spring and moves towards the inside of the inner drum, to open the drain opening of the inner drum. The water in the inner drum flows out through the opened drain opening, and after being collected by the water collection tank, the outflowing water is drained to the outside of the washing machine through the drain hose. In this way, the water held in the inner drum is drained.

Embodiment 5

In the embodiment, a cleaning-free washing machine is introduced. An inner drum 1 of the washing machine is a sealed container after a drum opening is fastened and sealed by a door cover. A side wall of the inner drum 1 is provided with lifting ribs 2. The lifting ribs 2 are hollow and communicate to the inside of the inner drum 1. At least one drain opening 4 communicated to a hollow part of the lifting rib 2 is formed in the side wall of the inner drum 1. The drain opening 4 is provided with a sealing valve inside the lifting rib 2. When the inner drum 1 rotates at a high speed, a valve plug 24 of the sealing valve moves along a radial center direction of the inner drum 1 under the action of centrifugal force to open the drain opening 4 formed in the side wall of the inner drum 1.

Through the above arrangement, the drain opening is hidden inside the lifting rib of the drum, and water in the drum is drained out from the hidden drain opening. At the same time, a sealing valve is installed at the drain opening, so that a valve plug of the sealing valve is correspondingly controlled by using a centrifugal force when the drum rotates at a high speed to correspondingly open and close the drain opening. When the washing machine performs the dehydration and/or drainage process, after the centrifugal force under the high-speed rotation of the drum acts on the valve plug of the sealing valve, the drain opening automatically opens and the drum performs corresponding drainage.

As shown in FIG. 1 to FIG. 5, this embodiment introduces a structure of a lifting rib of a drum for the above cleaning-free washing machine. The lifting rib 2 of the drum includes a lifting rib body 200 extending along structural lines of a side wall of the drum, and the body is of a shell structure whose lower side is open and that is fastened to the inner side wall of the inner drum 1. The lifting rib body 200 is hollow inside to form a mounting cavity 3 for installation of a sealing valve. The lifting rib 2 is provided with a water passing structure through which washing water in the inner drum 1 is guided into the mounting cavity 3.

The drum lifting rib of the drum is arranged as a hollow chamber, so that the lifting rib forms a chamber in which the sealing valve for draining water is installed. In this way, hidden assembly of the sealing valve is achieved, and the function of using the centrifugal force to drain water is implemented for the cleaning-free washing machine. At the same time, the lifting rib extends along the structural lines of the drum, so that when the drum rotates, the lifting rib blocks the washing water flowing against the wall, the blocked washing water flows into the lifting rib through the water-passing structure provided on the lifting rib to guide the water to be drained outside.

As shown in FIG. 1, in the embodiment, two opposite side walls of the lower side of the lifting rib body 200 are respectively provided with mounting ribs vertically protruding downwards, and the lower ends of the mounting ribs are provided with installation structures fixed to the side wall of the inner drum 1.

In the embodiment, left and right sides of the lower side of the lifting rib 2 are respectively provided with a first mounting rib 15 and a second mounting rib 16, a lower end of the first mounting rib 15 is provided with a bolt hole 19 for fixed installation relative to a bolt hole formed in the side wall of the inner drum 1. A lower end of the second mounting rib 16 is provided with a positioning pin 18 that is correspondingly in plug-connection to a position hole formed in the side wall of the inner drum 1. Further preferably, two first mounting ribs 15 and two second mounting ribs 16 are distributed at the four end corners of the square lifting rib 2, the two first mounting ribs 15 are arranged symmetrically with respect to the center of the lifting rib 2, and the two second mounting ribs 16 are arranged symmetrically with respect to the center of the lifting rib 2.

The four end corners of the lifting rib are provided with mounting ribs for fixing, so that the four end corners of the lifting rib are respectively fastened and installed, and the assembly of the lifting rib is more reliable. At the same time, the mounting ribs are provided with bolt holes and the positioning pins separately, and the lifting rib is pre-positioned for assembly by the positioning pins and then is fastened by the bolts, so that the assembly speed of the lifting rib is improved.

Figure 4:
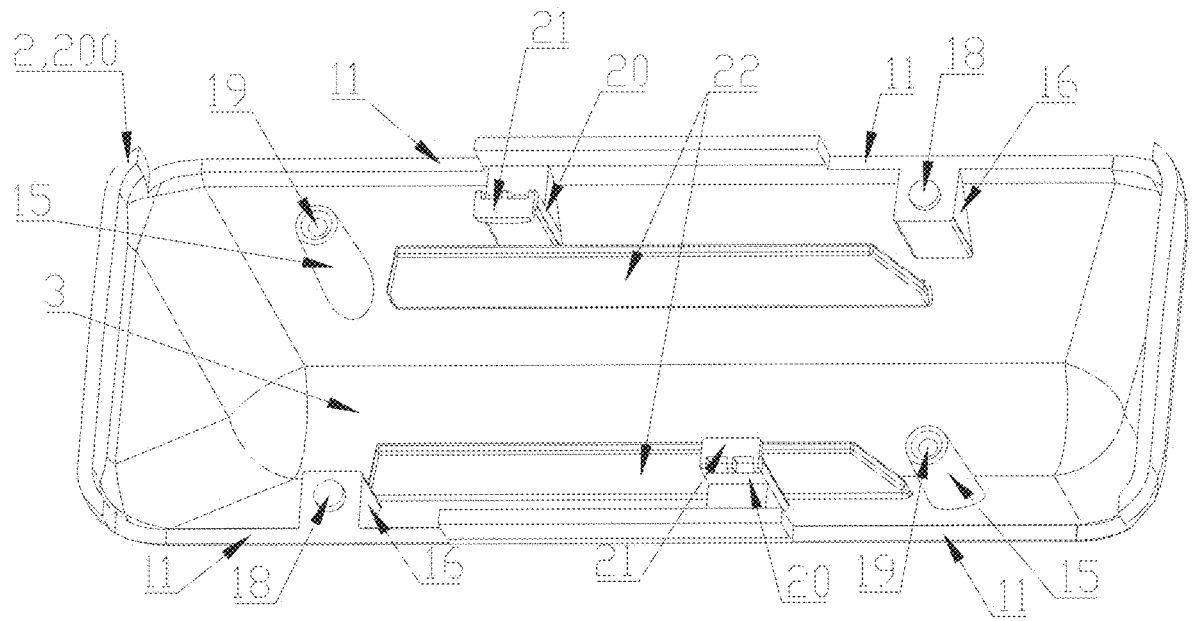
FIG. 4 is a bottom view of a lifting rib according to an embodiment of the present disclosure.

As shown in FIG. 4, in the embodiment, a lower side surface of the lifting rib 2 is provided with fixing ribs 20 protruding vertically downwards on the opposite two side walls, the lower ends of the fixing ribs 20 are provided with claws 21 horizontally protruding and extending, and the claws 21 are correspondingly clamped and fixed to clamping holes correspondingly formed in the side wall of the inner drum 1. Preferably, the fixing ribs 20 are arranged close to the center of the corresponding sides of the lifting rib 2. Further preferably, the claws 21 protrude and extend from the corresponding sides of the lifting rib 2 toward the center square of the lifting rib 2.

In the embodiment, the lifting rib body 200 has a conical shape that gradually protrudes upward from the left and right sides to the middle.

Figure 2:
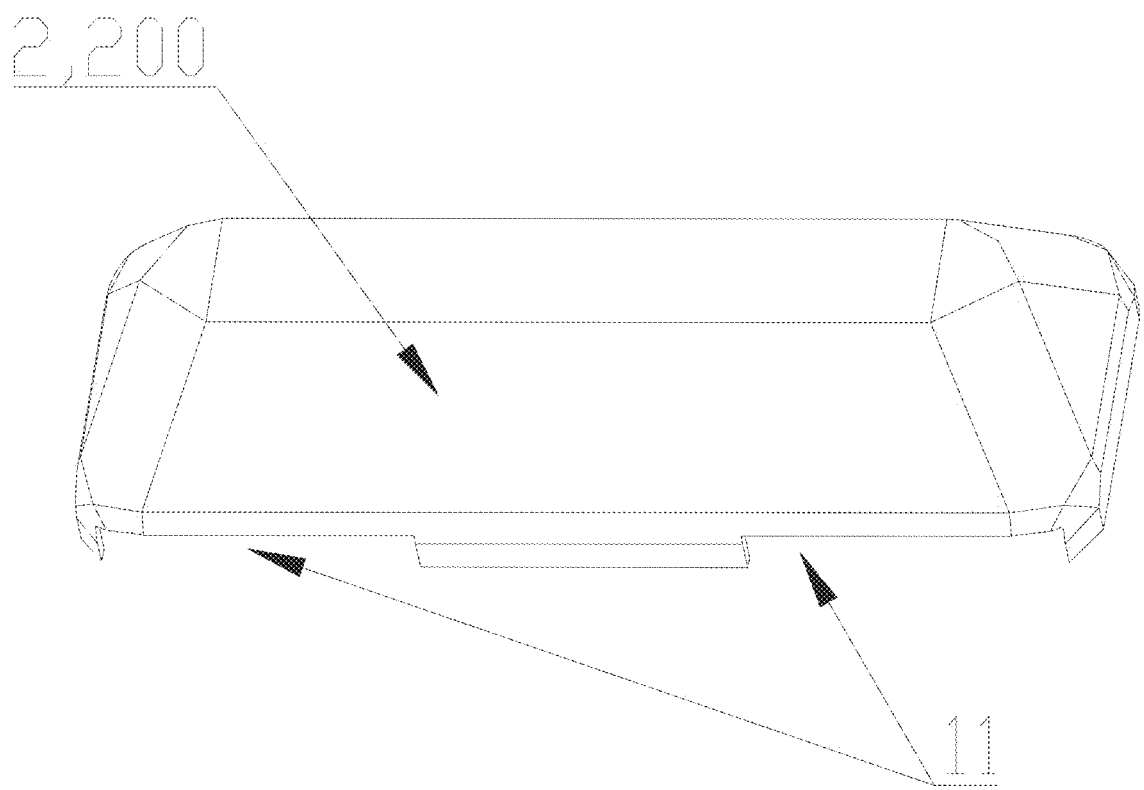
FIG. 2 is a schematic structural diagram of a lifting rib according to an embodiment of the present disclosure.
Figure 3:
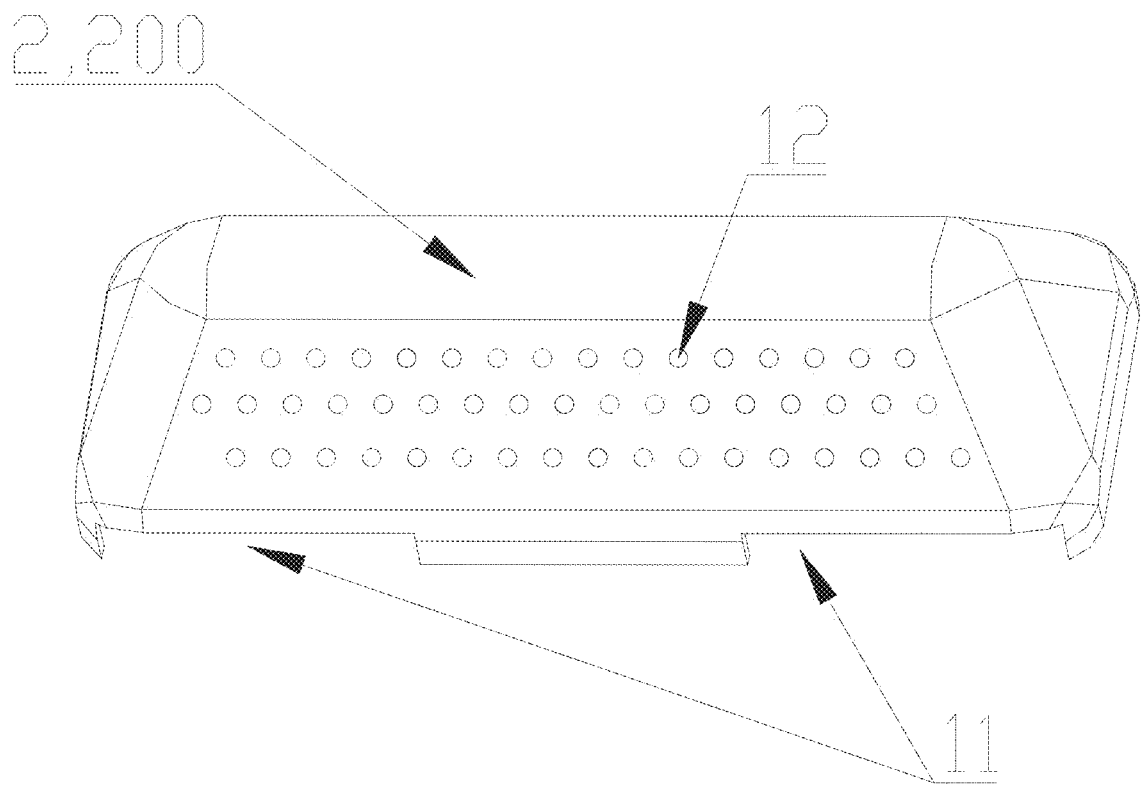
FIG. 3 is a schematic structural diagram of a lifting rib according to another embodiment of the present disclosure.

As shown in FIG. 2 to FIG. 4, in the embodiment, the outer periphery of the lifting rib 2 is of a square shape with arc chamfers at the end corners, the left and right side surfaces of the lifting rib 2 are inclined surfaces that gradually rise from the outer periphery to the center, and the top of the lifting rib 2 is a smooth arc surface that has an arc chamfer and that connects the tops of the two side surfaces. The front and rear ends of the lifting rib 2 are inclined surfaces that gradually incline downward from the end of the smooth arc surface to the outer periphery. The side edges of the inclined surfaces are respectively in sealed connection to the corresponding ends of the side surfaces of the lifting rib 2 by using the arc chamfered surfaces.

An appearance surface of the lifting rib is set to be composed of a plurality of smooth curved surfaces, to reduce the degree of friction between the lifting rib and the clothes, so as to further improve washing efficiency and reduce a washing abrasion rate of the clothes.

In the embodiment, the outer periphery of the lifting rib body 200 is correspondingly in fitted contact with the side wall of the inner drum 1, and there is at least one notch 11 in the outer periphery, so that the washing water in the inner drum 1 flows into the mounting cavity 3 from the notch 11. Preferably, the left and right sides of the square lifting rib 2 are respectively provided with multiple notches 11 formed at intervals. Further preferably, the notches 11 are respectively formed near the two ends on the left and right sides, the first mounting rib 15 and the second mounting rib 16 are respectively arranged in a corresponding section with the notches 11 at the corresponding end corners, and the fixing ribs 20 and the notches are arranged in a staggered manner.

The multiple staggered notches are arranged at the bottom of the lifting rib. On the premise of providing a stable assembly for the lifting rib, after the washing water flowing against the drum wall is blocked by the lifting ribs, the washing water flows into the lifting rib through the notches, so that the washing water all drains out through the notches in the bottom of the lifting rib by using the centrifugal force under the high-speed rotation of the drum.

In the embodiment, the lower side of the mounting cavity 3 enclosed by the lifting ribs 2 is constituted by the side wall of the inner drum 1. The corresponding area of the side wall of the inner drum 1 is provided with the drain openings 4 communicating with the inside of the mounting cavity 3, and the drain openings 4 are provided with the sealing valves whose switching on and off are controlled by using the centrifugal force. Preferably, the drain openings 4 are formed in the axis of the lifting rib 2.

In the embodiment, the lower side of the lifting rib 2 is provided with two limiting ribs 22 extending vertically downward and located in the mounting cavity. The two limiting ribs 22 are separated by a certain gap, and the counterweights of the sealing valves move in the gap, so that the gap provides a limiting effect for the movement of the sealing valves. Preferably, the two limiting ribs 22 are arranged symmetrically relative to the axis of the lifting rib 2.

As shown in FIG. 3, in the embodiment, a plurality of water penetration holes 12 are formed in the lifting rib body 200, and each water penetration hole 12 communicates the mounting cavity 3 with the drum outside the lifting rib body 200, to guide the washing water in the inner drum 1 to flow into the lifting rib, so as to further increase the rate at which the washing water in the drum flows into the lifting rib. Preferably, the rear end of the lifting rib 2 is arranged close to the bottom of the inner drum, and there is a certain gap between the rear bottom of the lifting rib 2 and the side wall of the inner drum 1, to guide the washing water in the mounting cavity 3 to flow backwards into the bottom of the inner drum of the inner drum 1.

Embodiment 6

As shown in FIG. 1 to FIG. 7, the embodiment introduces a sealing valve installation structure for the above cleaning-free washing machine. The sealing valve installation structure includes a support plate 9 mounted on the inner side wall of an inner drum 1. A through hole 23 corresponding to drain openings 4 formed in the side wall of the inner drum 1 is provided in the middle of the support plate 9, and a certain gap between the support plate 9 and the side wall of the inner drum 1 is provided to form a space for valve plugs of sealing valves to move up and down. Sleeve-shaped mounting sleeves 6 are fixedly installed on the upper side of the support plate 9. Inner through holes of the mounting sleeve 6 and the through hole 23 formed in the support plate 9 are coaxially and oppositely arranged, so that the valve plugs of the sealing valves are coaxially installed in the inner through hole and can move up and down.

The above installation structure is arranged on the drum, the valve plugs of the sealing valves arranged at the drain openings can be correspondingly assembled in the gap between the support plate 9 and the drum, so that the valve plugs have an upper and lower movement margin in the gap, and it is ensured that the valve plugs correspondingly block or open the drain openings. At the same time, valve plug columns are correspondingly assembled in the mounting sleeves to be limited in the movement direction by the mounting sleeves, thereby avoiding tilting of the valve plug columns. In addition, the mounting sleeves are arranged on the support plate, and supporting points of counterweights of the sealing valves can be correspondingly mounted at the outer peripheries of the mounting sleeves. In this way, prying rotation and installation fixation of the counterweights are ensured.

In the embodiment, the sealing valve installation structure is arranged inside the lifting ribs described in Embodiment 5 above. One or more sealing valves can be installed in the mounting cavity inside the lifting rib, and each sealing valve includes one sealing valve installation structure.

As shown in FIG. 1, in the embodiment, at least one lifting rib 2 is installed on the side wall of the inner drum 1 of the washing machine, and a lifting rib body 200 is of a shell structure whose lower side is open and that is fastened to the inner side wall of the inner drum 1. The rib lifting body 200 is hollow inside to form a mounting cavity 3 for installation of the sealing valve, and the sealing valve installation structure is arranged in the mounting cavity 3.

Figure 5:
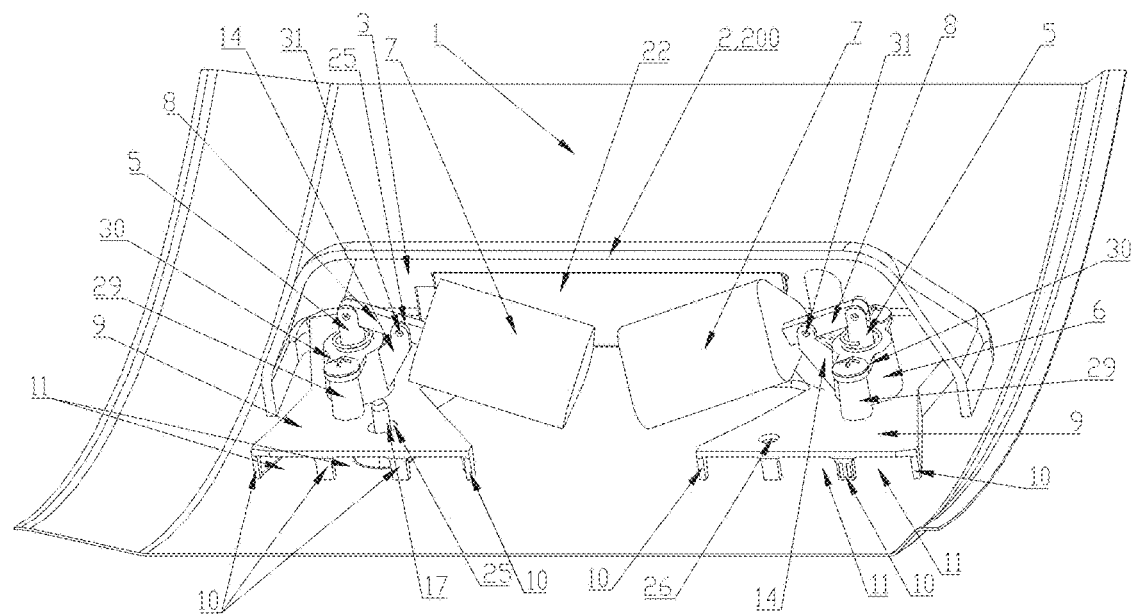
FIG. 5 is a partial sectional view of a lifting rib according to an embodiment of the present disclosure.
Figure 6:
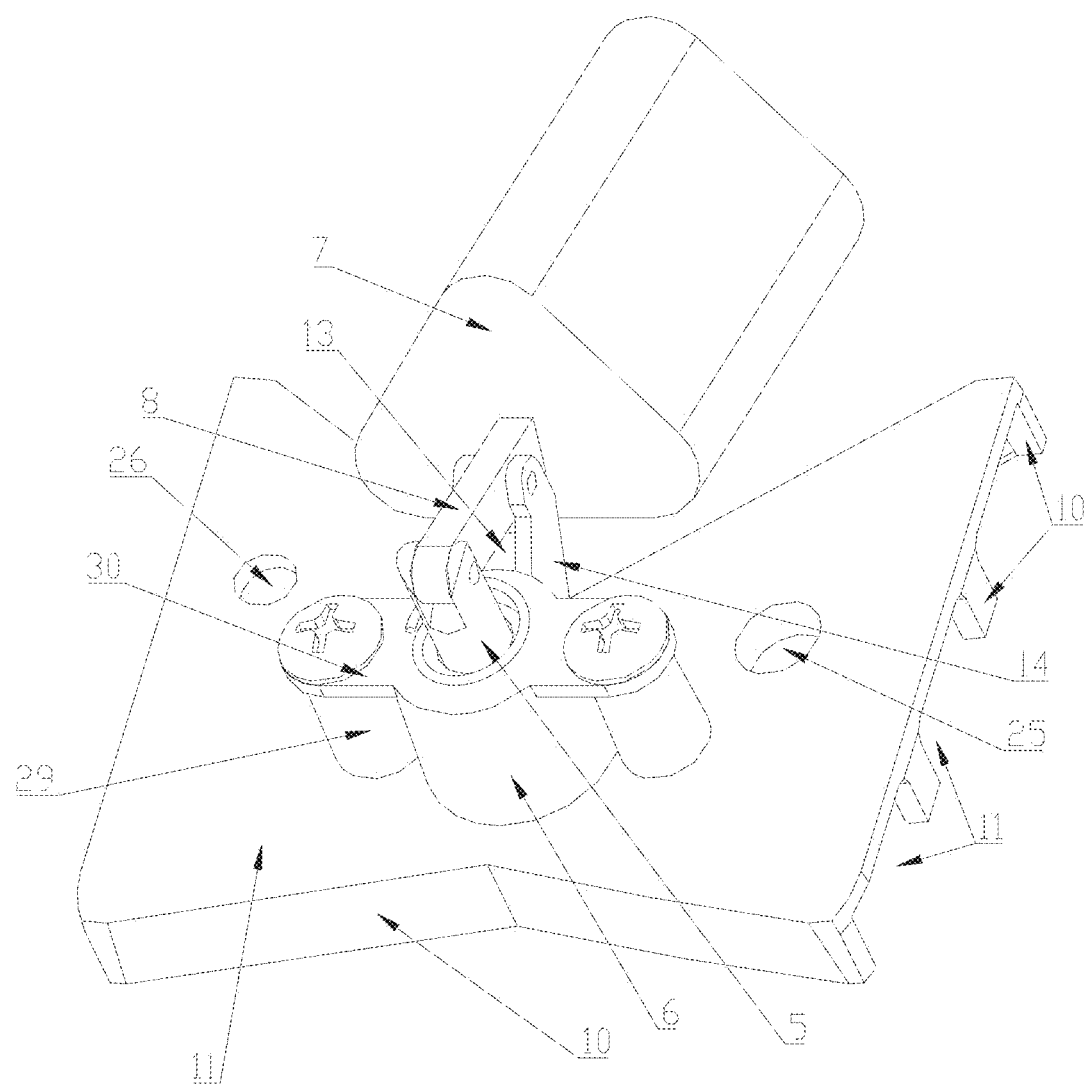
FIG. 6 is an enlarged schematic structural diagram of a sealing valve according to an embodiment of the present disclosure.
Figure 7:
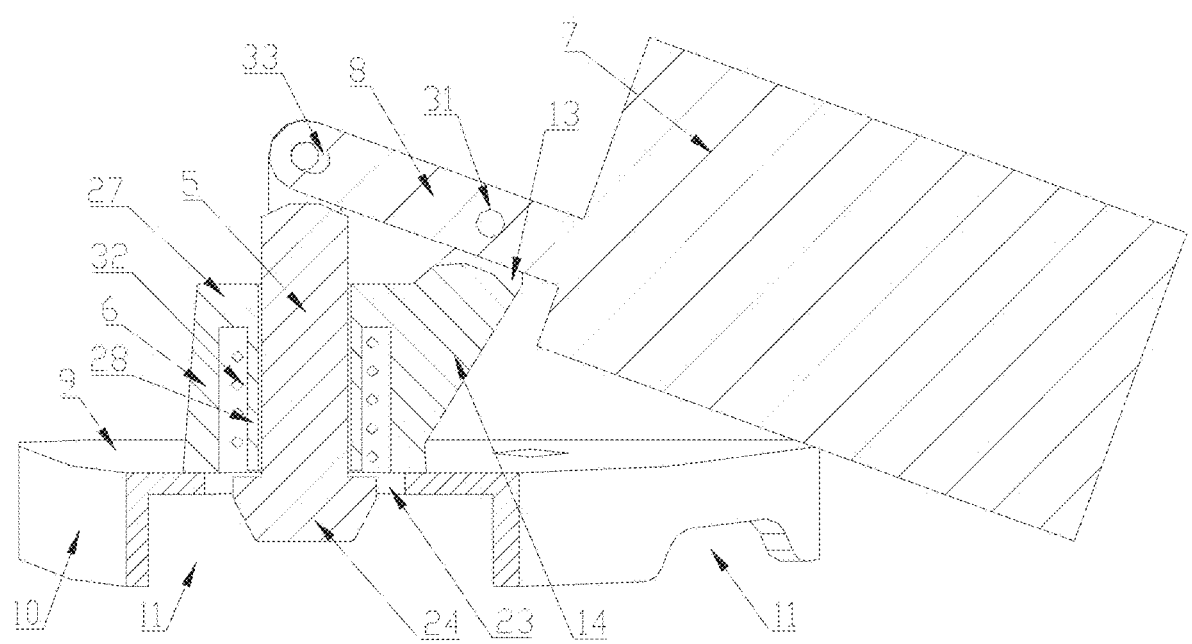
FIG. 7 is a schematic structural diagram of a section of a sealing valve according to an embodiment of the present disclosure.

As shown in FIG. 5 to FIG. 7, in the embodiment, the support plate 9 is a plate that is laid flat on the inner wall of the drum, the lower side of the support plate 9 is provided with multiple support ribs 10 protruding and extending downward, and the lower ends of the supporting ribs 10 are in limit contact with the inner side wall of the inner drum 1. Preferably, the outer periphery of the supporting plate 9 is provided with multiple supporting ribs 10 arranged at intervals. Further preferably, the left and right sides of the supporting plate 9 are provided with multiple supporting ribs 10 arranged at interval and the front and rear sides of the supporting plate 9 are respectively provided with a whole supporting rib 10 extending along the corresponding side.

In the embodiment, the left and right sides of the lifting rib 2 are respectively provided with notches 11, and the notches 11 are formed corresponding to the sides of the support plate 9, so that the sides of the support plate 9 are clamped in the notches 11 on the corresponding sides.

In the embodiment, the support plate 9 is provided with a downwardly recessed positioning groove 26 and a jack 25 that is arranged in a penetration manner. The jack 25 vertically penetrates through a panel of the support plate, and the lower side of the lifting rib 2 is provided with a first mounting rib 15 that protrudes and extends downward and that is coaxially arranged with the jack 25. The lower end of the first mounting rib 15 is provided with a bolt hole 19 coaxially opposite to the jack. A bolt 17 sequentially passes through the drum wall and the support plate 9 from the outer wall of the drum upwards, and then is correspondingly screwed and fixed to the bolt hole 19 formed in the first mounting rib 15, so that the support plate 9 and the lifting rib 2 are fixedly installed with the inner drum 1. The positioning groove 26 is formed in the upper side surface of the support plate 9, the lower side of the lifting rib 2 is provided with a second mounting rib 16 protruding and extending downward and coaxially arranged corresponding to the positioning groove 26, and the lower end of the second mounting rib 16 is provided with a positioning pin 18 that is correspondingly in plug-connection to the positioning groove 26.

In the embodiment, the mounting sleeves 6 are of a vertically extending tube structure. The lower ends of the mounting sleeves 6 are open, the upper ends of the mounting sleeves 6 are provided with folding edges 27 protruding horizontally inward, and the inner peripheries of the folding edge 27 are provided with inner peripheral folding edges 28 vertically extending downward to the lower ends of the mounting sleeves 6. The outer walls of the inner peripheral folding edges 28 and the inner walls of the folding edges 27 are separated by certain gaps, to form chambers for reset springs of the sealing valves to be installed and fixed. Preferably, the lower ends of the mounting sleeves 6 are placed on the upper side of the support plate 9, the mounting sleeves 6 are coaxially arranged with the through hole 23 formed in the support plate 9, the inner peripheral diameters of the lower ends of the mounting sleeves 6 are less than or equal to the diameter of the through hole 23, and the outer peripheral diameters of the lower ends of the mounting sleeves are greater than the diameter of the through hole 23.

In the embodiment, the upper side of the support plate 9 is provided with mounting ribs 29 protruding and extending upward, and the upper ends of the sealing sleeves 6 are provided with extending ribs 30 horizontally protruding and extending outward. The extending ends of the extending ribs 30 and the upper ends of the mounting ribs 29 are correspondingly overlapped and fitted, and overlapping parts are fixed and connected by the bolts, so that the support plate 9 and the mounting sleeves 6 are fastened to be installed by the bolts. Preferably, mounting ribs 29 respectively arranged on the left and right sides of the through hole 23 are arranged on the upper side of the support plate 9, and the extending ribs 30 horizontally protruding and extending outward are respectively provided on the left and right sides of the mounting sleeves 6, so that the two extending ribs 30 and the mounting ribs 29 on the corresponding sides respectively overlap and are fixed to be installed by the bolts.

In the embodiment, one side of each mounting sleeve 6 is provided with a second extending rib 14 that horizontally protrudes and extends outward, and the extending end of the second extending rib 14 is provided with a hinge hole 31 having a horizontal axis, to implement hinged installation of the counterweight of each sealing valve. Preferably, an included angle between the second extending rib 14 and the extending direction of the extending rib 30 is 90 degrees, and the axis of the hinge hole 31 is parallel to the extending direction of the extending rib 30. Further preferably, the extending end of the second extending rib 14 is higher than the top of each mounting sleeve 6, and the extending end of the second extending rib 14 is provided with a slot 13, the slot 13 is formed along the extending direction of the second extending rib 14, to implement corresponding plug-connection to the counterweight of each sealing valve. The slot 13 is provided with a horizontally extending hinge hole 31.

In the embodiment, the mounting cavity 3 enclosed by the lifting rib 2 is provided with two oppositely arranged sealing valve mounting structures, and the second extending ribs 14 of the two sealing valve mounting structures oppositely extend in an approaching direction.

Embodiment 7

As shown in FIG. 1 to FIG. 7, the embodiment introduces a sealing valve plug structure for the above cleaning-free washing machine. The sealing valve plug structure includes valve plug columns 5 corresponding to drain openings formed in the side wall of the inner drum 1, and counterweights 7 are hinged to the upper end of the valve plug columns 5. Sealing valve installation structure are fixedly installed on the side wall of the inner drum 1, and reset springs 32 are clamped between the sealing valve installation structures and the valve plug columns 5.

The above valve plug structures are installed on the drum, the counterweights can be used to generate an action, under the action of centrifugal force, to correspondingly open the drain opening, and the valve plug columns can further be reset by the reset springs to make the valve plugs correspondingly block the drain opening. In this way, the centrifugal force under the high-speed rotation of the drum is used to act on the valve plug columns to correspondingly open and close the drain openings.

The sealing valve plug structure in the embodiment can be installed on the sealing valve installation structure in the above Embodiment 6, or valve plugs of a sealing valves can further be fixedly installed on the drum of the washing machine by using the above sealing valve installation structure. In particular, the sealing valve plug structure in the embodiment can further be installed in the lifting ribs described in Embodiment 5 by using the sealing valve installation structure described in Embodiment 6. The above mounting structure extending to the hollow part of the lifting rib is arranged on the side wall of the drum, so that a support rod is installed on the top of a mounting seat at a certain height from the side wall of the drum, and there can be a certain height difference between the end of the support rod and the side wall of the drum. In this way, the counterweights move downward to provide displacement space for moving the valve plug.

As shown in FIG. 5 to FIG. 7, in the embodiment, the valve plug columns 5 are coaxially arranged at the drain openings 4, and the lower ends of the valve plug columns 5 is provided with valve plugs 24 protruding outward in the radial direction. Preferably, the valve plugs 24 are plugs that gradually expand a radial size outward from bottom to top. The radial width of a large end of each valve plug 24 is larger than the diameter of each drain opening 4, and the radial width of a small end is smaller than the diameter of each drain opening 4.

In the embodiment, the sealing valve installation structure includes a support plate 9 installed on the inner side wall of the inner drum 1, a through hole 23 corresponding to the drain openings 4 formed in the side wall of the inner drum 1 is formed in the middle of the support plate 9, and there is a certain gap between the support plate 9 and the side wall of the inner drum 1, to form a space for the valve plugs of the sealing valves to move up and down. The upper side of the support plate 9 is fixedly provided with a sleeve-shaped mounting sleeves 6, and inner through holes of the mounting sleeves 6 and the through hole 23 formed in the support plate 9 are coaxially and oppositely arranged, so that the valve plug columns 5 of the sealing valves are coaxially arranged in the inner through holes and can move up and down.

In the embodiment, the mounting sleeves 6 are of a vertically extending tube structure. The lower ends of the mounting sleeves 6 are open, the upper ends of the mounting sleeves 6 are provided with folding edges 27 protruding horizontally inward, and the inner peripheries of the folding edges 27 are provided with inner peripheral folding edges 28 vertically extending downward to the lower ends of the mounting sleeves. The outer walls of the inner peripheral folding edges 28 and the inner walls of the folding edges 27 are separated by certain gaps, to form chambers for reset springs 32 of the sealing valves to be installed and fixed. Preferably, the outer walls of the inner peripheral folding edges 28 are sleeved with the reset springs 32, the upper ends of the reset springs 32 collide with the lower side of the folding edges 27, and the lower ends of the reset springs 32 collide with the large end of the valve plugs 24. Further preferably, the outer walls of the valve plug columns 5 collide with the inner walls of the inner peripheral folding edges 28 in a limiting manner.

In the embodiment, one side of each mounting sleeve 6 is provided with a second extending rib 14 horizontally protruding and extending outward, and the extending end of the second extending rib 14 is provided with a hinge hole 31 having a horizontal axis. The counterweights of the sealing valves 7 and the second extending ribs 14 are mounted via a pin passing through the hinge hole 31.

In the embodiment, the upper ends of the counterweights 7 are provided with connecting ribs 8 protruding and extending upward in the axial direction. The upper ends of the valve plug columns 5 pass through the tops of the mounting sleeves 6, and the ends of the connecting ribs 8 are connected to the upper ends of valve plug columns 5 in a hinging manner. The middle parts of the connecting ribs 8 and the second extending ribs 14 of the mounting sleeves 6 correspondingly overlap and are in plug-connection, and are installed in a hinging manner at the overlapping portion via a penetrated pin. Preferably, the extending ends of the second extending ribs 14 are higher than the tops of the mounting sleeves 6, the extending ends of the second extending ribs 14 are provided with slots 13, the slots 13 are arranged along the extending direction of the second extending ribs 14, and the middle parts of the connecting ribs 8 of the sealing valve are correspondingly inserted into the slots 13. The slots 13 are provided with the hinge holes 31 horizontally extending, and the middle parts of the connecting ribs 8 are provided with the corresponding overlapping hinge hole, so as to implement hinged installation at the overlapping portion via the penetrated pins.

In the embodiment, the end of each connecting rib 8 is provided with a rotating hole hinged to the upper end of the corresponding valve plug column 5. The rotating hole is a long-strip-shaped through hole 33 extending along the axial direction of the corresponding connecting rib 8, to provide a space for the connecting rib 8 to drive the valve plug column 5 to move up and down when the counterweight 7 rotates around the mounting sleeve 6.

In the embodiment, the outer periphery diameters of the upper ends of the valve plugs 24 are greater than the diameters of the lower ends of the inner peripheral folding edges, and the heights of the valve plugs 24 are less than the height of the gap between the support plate and the side wall of the drum.

In the embodiment, the mounting cavity 3 enclosed by the lifting ribs 2 is provided with two oppositely arranged sealing valves, the two sealing valves are arranged along the direction of the structural lines of the drum, and the counterweights 7 of the two sealing valve plug structures oppositely extend towards an approaching direction.

In the embodiment, when the washing machine is in the dehydration and/or drainage state, the drum is in a high-speed rotation state, and the water in the drum flows against the inner wall under the action of centrifugal force, and flows into the lifting rib from the gap between the drum wall and the lifting rib. In this case, the counterweights move toward the outer periphery of the drum under the action of centrifugal force, the counterweights provide an upward prying force for the valve plug columns to the center of the drum via the connecting ribs, and the valve plug overcomes the elastic force of the reset springs under the centrifugal force of the counterweights, so that the valve plug columns displace in the radial direction in the drum to open the drain openings. When the washing machine is in a non-dewatering and non-draining state, the drum is not in a high-speed rotation state, the counterweights are no longer affected by the centrifugal force, and the reset springs are in a pulling state, the reset springs exert a pushing force on the valve plug columns toward the outer periphery of the drum, so that the valve plugs move to the initial position until the drain openings are closed, and when the drum is in the washing or rinsing process, the reset springs always provide an elastic force for the valve plug columns to ensure that the valve plugs always block the drain openings, so as to ensure that the drain openings are always in a closed state.

The above descriptions are only the preferred embodiments of the present disclosure, and are not intended to limit the present disclosure in any form. The preferred embodiments are disclosed in the present disclosure, but are not intended to limit the present disclosure. Any person of skills familiar with this patent can use, without departing from the scope of the technical solution of the present disclosure, the technical content suggested above to make slight changes or modifications as equivalent embodiments with equivalent changes. Any simple modification, equivalent changes, or improvement made on the above embodiments based on the contents of the technical essence of the present disclosure without departing from the content of the technical solutions of the present disclosure shall fall within the protection scope of the present disclosure.

The invention claimed is:

1. A washing machine, comprising:
    a door cover;
    an inner drum; and
    an inner drum cover arranged at a drum opening of the inner drum of the washing machine; wherein,
    an axis of the inner drum extends horizontally or gradually inclines downward from front to rear;
    the inner drum cover is configured to open or close the drum opening, the inner drum is a closed container after the drum opening is closed by the inner drum cover;
    the inner drum cover is independently arranged from the door cover, so that the drum opening is opened or closed by operating the inner drum cover separately from the door cover, and
    an outer periphery of the inner drum cover is sealed and contacted with the drum opening to seal the drum opening; and
    a bending portion being horizontally bent is arranged at a periphery of the drum opening,
    the bending portion extends in a direction away from a bottom of the inner drum, the bottom of the inner drum is a rear wall of the inner drum,
    an extending end of the bending portion is arranged on a front end side of the drum opening,
    the bending portion includes a first bending portion and a second bending portion that are connected in an extending direction,
    the first bending portion is a tube structure horizontally extending, and the second bending portion is a conical structure, a diameter of a small end of the second bending portion is less than a diameter of a large end of the second bending portion,
    the small end is correspondingly connected to the first bending portion, and the large end forms the extending end of the second bending portion,
    the inner drum cover is provided with a flange being bent away from a front sidewall of the inner drum,
    the flange includes a first flange and a second flange, and
    the first flange is correspondingly sealed and in contact with the first bending portion, and the second flange correspondingly is sealed and in contact with the second bending portion.

2. The washing machine according to claim 1, wherein at least one sealing ring is arranged at a position at which the inner drum cover is sealed and contacted with the drum opening, and two sides of the sealing ring are sealed contacted with the inner drum cover and the drum opening respectively.

3. The washing machine according to claim 1, wherein the inner drum is provided with a drain opening, and a drain valve is installed at the drain opening;

the washing machine is provided with a positioning and locking mechanism that fixes the inner drum when the inner drum rotates to a fixed drainage position;

the washing machine is provided with a valve plug opening mechanism for opening the drain valve after the inner drum rotates to the fixed drainage position, so that when the washing machine drains water, and after the inner drum rotates to the fixed drainage position, the drain valve is opened to drain away washing water in the inner drum.

4. The washing machine according to claim 1, wherein a drain opening is arranged on a side wall of the inner drum, and a sealing valve which moves along a radial direction of the inner drum to be open and close is arranged at the drain opening, and a valve body of the sealing valve is moved in a plane parallel with the bottom of the inner drum by a counterweight under an action of centrifugal force, to open the drain opening on the side wall of the inner drum when the inner drum rotates at a high speed.

5. The washing machine according to claim 4, wherein the side wall of the inner drum is provided with at least one lifting rib extending along a generatrix of the inner drum, and each at least one lifting rib is hollow inside, a hollow part of each at least one lifting rib communicates with a respective drain opening arranged on the side wall of the inner drum, and each drain opening arranged in the hollow part of each at least one lifting rib includes a respective sealing valve.

6. The washing machine according to claim 1, wherein a center of the bottom of the inner drum is connected to one end of a water inlet pipe, another end of the water inlet pipe is connected to a water inlet box of the washing machine, to feed water into the inner drum through the center of the bottom of the inner drum.

7. The washing machine according to claim 1, wherein a length of the first and second flanges is greater than a length of the first and second bending portions.

8. The washing machine according to claim 2, wherein the sealing ring is made of a material having elastic deformation.

9. The washing machine according to claim 3, wherein the drain opening is arranged at an outer periphery of the bottom of the inner drum.

* * * * *